Feb. 28, 1939.                D. DILLINGER                2,148,807
                             EVACUATING DEVICE
                            Filed Jan. 25, 1937
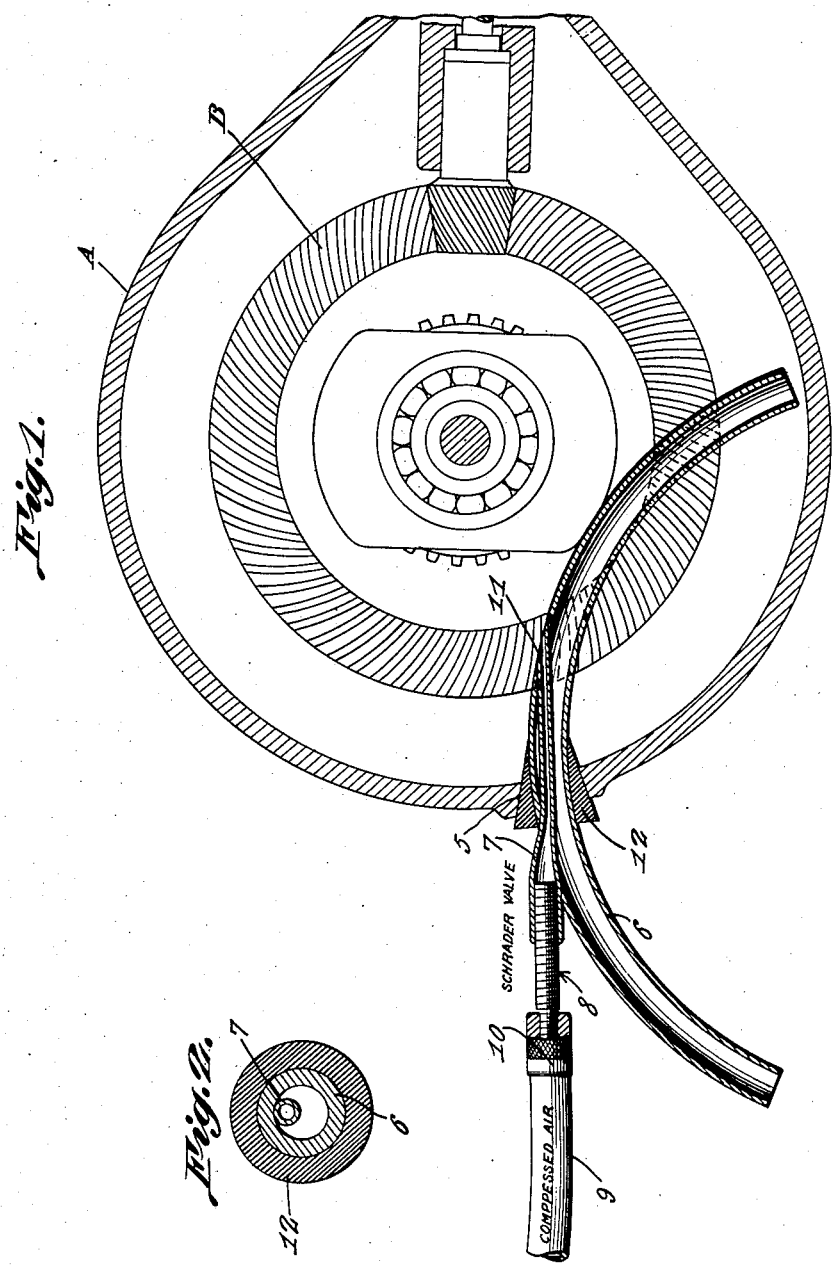
Dale Dillinger, INVENTOR
BY Victor J. Evans & Co.
ATTORNEYS Patented Feb. 28, 1939

2,148,807

UNITED STATES PATENT OFFICE 2,148,807

EVACUATING DEVICE

Dale Dillinger, Akron, Ohio

Application January 25, 1937, Serial No. 122,289

1 Claim. (Cl. 184—1.5)

The invention relates to a grease ejector and more especially to a grease evacuating device.

The primary object of the invention is the provision of a device of this character, wherein the grease within a differential gear casing or housing can be readily and easily removed, the device being of novel construction so that it can be inserted through a filling opening in the housing or casing for the differential of an automobile so that the grease trapped therein can be readily evacuated and delivered into a pan or other receiver.

Another object of the invention is the provision of a device of this character, wherein a compressed air hose can be readily and easily attached for delivering air under pressure into the differential housing or casing so that the grease therein will be forced therefrom to without said housing or casing.

A further object of the invention is the provision of a device of this character, which is extremely simple in its construction, convenient for easy handling, thoroughly reliable and efficient in operation, strong, durable, and inexpensive to manufacture.

With these and other objects in view, the invention consists in the features of construction, combination and arrangement of parts as will be hereinafter more fully described illustrated in the accompanying drawing, which discloses the preferred embodiment of the invention and pointed out in the claim hereunto appended.

In the accompanying drawing:

Figure 1 is a fragmentary vertical sectional view through a differential casing or housing showing the device constructed in accordance with the invention applied thereto for evacuating grease from said housing or casing.

Figure 2 is an enlarged vertical transverse sectional view through the device.

Similar reference characters indicate corresponding parts throughout the several views in the drawing.

Referring to the drawing in detail, A designates generally a portion of a differential gear casing or housing in which is confined the differential mechanism B for motor vehicles and such housing or casing as is customary holds the grease or lubricant for the differential mechanism which grease or lubricant is introduced through a filling hole or opening 5 as is usual provided in said housing or casing.

The evacuating device constituting the present invention comprises a main arched passover drain or evacuating tube 6 made from metal and a compressed air delivering nozzle 7, respectively, the latter being trained through the said tube 6 at the higher point of the arch formation of such tube, the body of the tube being suitably sealed about said nozzle to avoid leakage therebetween and fitted in the receiving end of said nozzle is an internally valved inlet stem 8 for detachable connection or coupling with a compressed air supply tube or hose 9, the coupling therebetween being indicated at 10. The internal valve (not shown) within the stem 8 is of the return check type.

Carried about the tube 6 preferably at the point of intersection of the nozzle 7 to be intermediate between its discharge tip 11 and the stem carrying end thereof is a sleeve-like resilient stopper plug 12 which is forcibly inserted in the opening 5 in the housing or casing A when the tube 6 is introduced within said housing or casing and positioned as shown in Figure 1 of the drawing so that the end of this tube within the housing or casing will be close to the lowermost point thereof and on delivering air under pressure above the grease level of the grease confined within the housing or casing the latter will be forced to discharge through the tube 6 for deposit by said tube into a container or other receiver without the said housing or casing and in this fashion the confined grease within the housing or casing will be readily evacuated therefrom.

The stopper plug 12 seals the tube 6 in the hole or opening 5 in the housing or casing to eliminate any escapement of air under pressure through said hole or opening during the use of the device.

The device in view of the character thereof is hand manipulated both for introduction into the housing or casing A and on removal therefrom. It should be apparent from Figure 1 of the drawing that in the use of the device the grease confined within the housing or casing A can very readily be entirely evacuated or removed for complete cleaning of such housing or casing.

What is claimed is:

A device for removing oil or grease from a gear casing of that type having a port at the level of the oil or grease therein, said device comprising a substantially rigid, substantially bow-shaped tube of such size as to have one end inserted into said casing through said port and the tube capable of being rocked through the opening longitudinally thereof so that the inserted end of the tube will clear the gears in said casing and will find the bottom of the casing, a closure for said port associated with the tube intermediate its ends, the other end of said tube providing a discharge outlet; and an air-supply duct associated with said tube at said closure, said duct having an inlet at the outer side of said closure and having means for coupling thereto a supply of air under pressure and having an outlet at the inner side of the closure and arranged to be above the level of said oil or grease when said tube is inserted in said casing.

DALE DILLINGER.